Patented Dec. 23, 1952

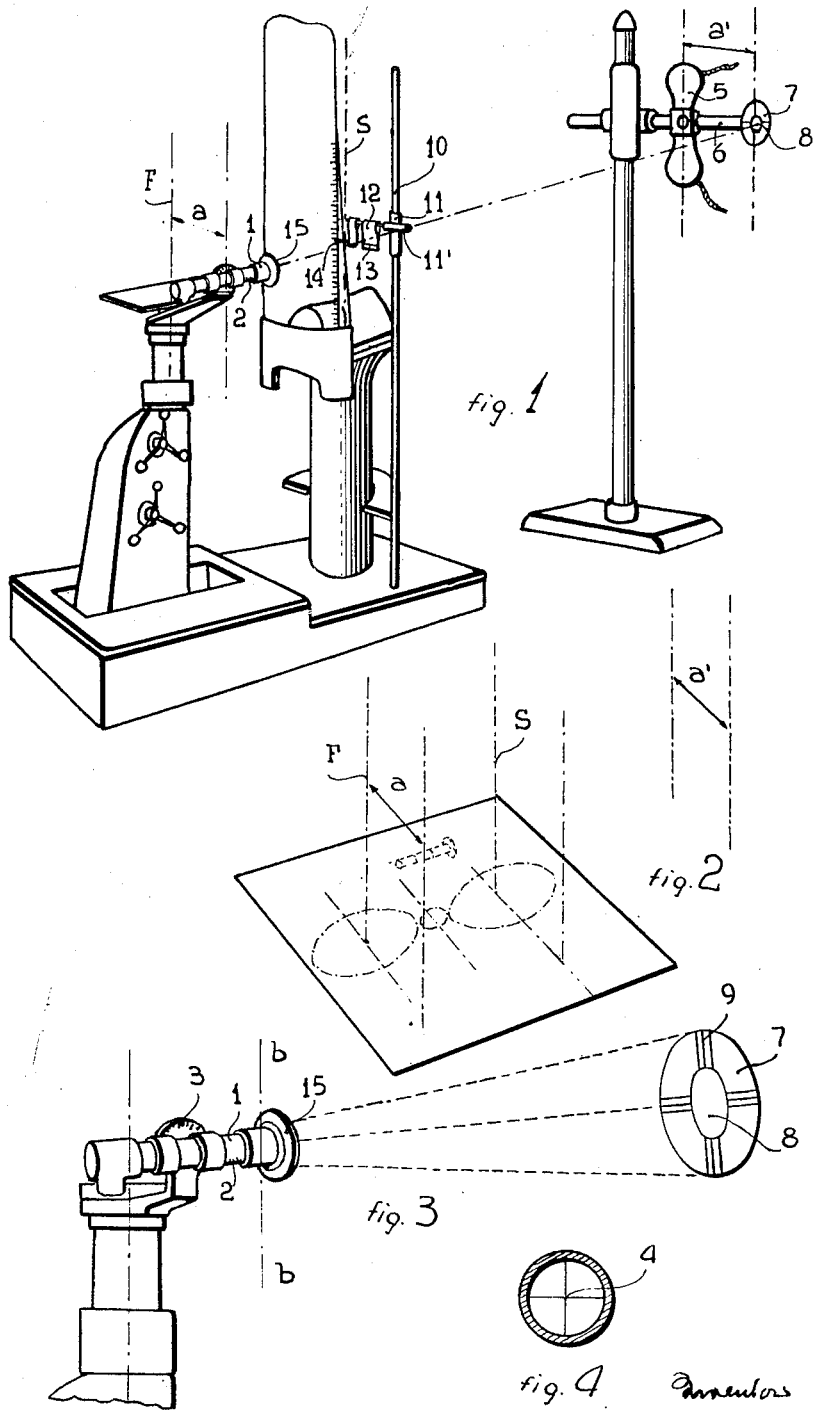

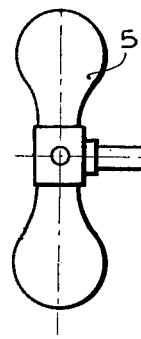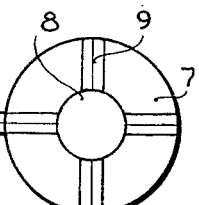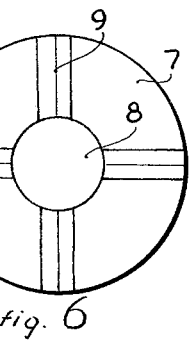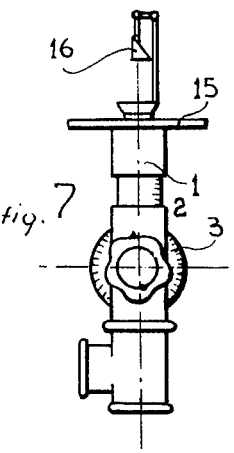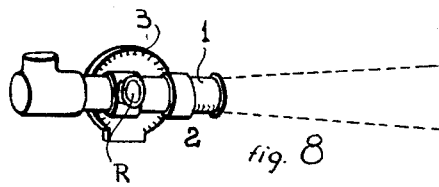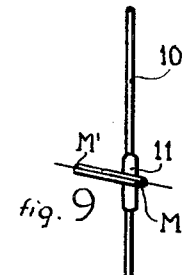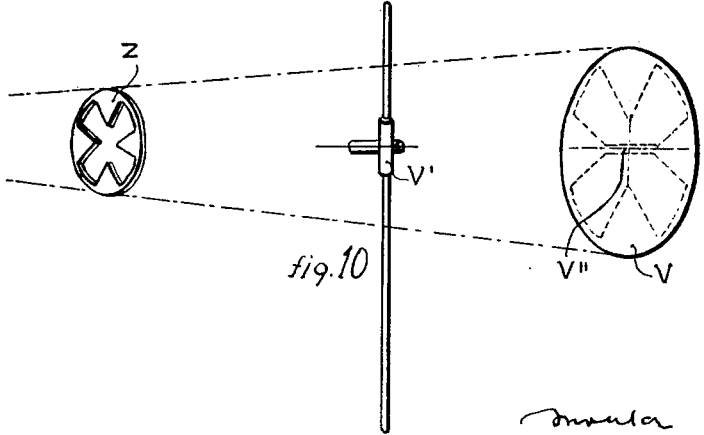

2,623,180

UNITED STATES PATENT OFFICE 2,623,180

X-RAY TUBE CENTERING DEVICE FOR LAMINOGRAPHIC EXAMINATIONS

Gino Zurli and Aldo De Regibus, Genoa, Italy

Application September 15, 1950, Serial No. 184,983
In Italy October 8, 1949

9 Claims. (Cl. 250—64)

It is known that the technique of laminography in the radiological field requires a certain alignment of the film and the body to be examined with the Roentgen tube. To satisfy this requirement, in the technique based on the rotation of the subject to be examined and of the film, apparatus are also known which connect mechanically in an organic ensemble the tube and the system of supports of the body to be examined and of the film, but such apparatus are excessively complicated, anti-economical and not often exact in every operation.

The present invention relates to an optical contrivance which permits to align the focal spot of the tube with the axis of movement of the subject and of the film without recourse to the above mentioned mechanical connection.

By this method the system of optical alignment between the three points, object of the present invention, is especially useful in apparatus to be used for taking radiological laminographs, both according to the usual technique called "by frontal projection" and above all according to the technique called "by transversal axial projection" i. e. for the reproduction of strata horizontal in relation to the axis of the human body.

Substantially, this contrivance which renders the tube independent from the mechanical complex provoking the useful movements of the film and of the body to be examined for the purpose of laminographic investigations is composed by a projector placed on the support of the rotation axis of the film but not rotating with it: this projector is placed at a constant calculated distance (a) from the rotation axis of the film, which is placed horizontally, and at the exact height of the film, when the reproduction is required of axial transversal strata of the body with oblique incidence of the ray beam on the film, so that the projected light beam will have its optical axis rigorously parallel to the vertical plane on which the rotation axis of the film and of the subject lie. However on the lens of the projector a cross reticle is fitted whose centre corresponds to the optical axis of the projector and whose origin is on the same horizontal plane of the film. Parallelly the Roentgen tube is fitted with an arm at right angles to its axis and provided with a disc on which a reticle is marked whose centre must be at a distance (a) in relation to the focal spot of the tube exactly equal to the distance previously determined between the optical axis of the projector and the rotation centre of the film ($a=a'$).

The disc connected to the tube is provided, at its centre, with a flat mirror. A stem provided with a slide fitted with a screen presenting a datum line exactly consecutive to the pointer which determines the section of the subject to be examined is inserted on a vertical plane (in which we find the rotation axis of the subject) and at right angles with the plane on which the rotation axis lie.

The present invention is illustrated schematically by way of example in the attached drawings in which:

Fig. 1 is a schematical view of the whole apparatus and of the optical contrivance of alignment.

Fig. 2 is the geometrical scheme of the whole of a radio-graphic apparatus for laminographic investigations fitted with the above mentioned improvements.

Fig. 3 is a detail of the projector.

Fig. 4 is a section b—b' of Fig. 3 with special reference to the cross recticle incorporated in the projector.

Fig. 5 is a detail of connection between the tube and the reflecting disc.

Fig. 6 is a detail of the reticle applied on the disc.

Fig. 7 is the fitting of a refraction prism on the projector.

On the same support of the axis F (Figs. 1 and 2) of rotation of the film, the projector 1 (Figs. 1, 2, 3) is fitted at a known distance (a). The projector is fitted with graduated scale 2 allowing the reading of the distance between the film and the tube as well as with graduated scale 3 (Figs. 1, 3, 7) determining the angular values of the projector in the vertical plane. The lenses of the projector are internally fitted with a cross recticle 4 (Fig. 4) and the optical axis of the light beam emitted by the projector (Figs. 3 and 4) section b—b', passes exactly through the center of this cross reticle. By means of arm 6 disc 7 is fitted laterally to tube 5 (Figs. 1 and 5). The disc has at is centre reflecting mirror 8 which is provided with a cross recticle 9 (Fig. 6) the centre of which will be at a distance (a') from the axis of tube 5 equal to the distance between the projector axis and the rotation axis of the film. Subordinately, the vertical line of the cross reticle on disc 7 must be absolutely parallel to the vertical median of the tube, whilst the vertical line of the reticle on the lenses must be rigorously parallel to the vertical plane passing through the film-subject axis of rotation. Stem 10 with sleeve 11, provided with slide 11' and transparent screen 12 which screen is marked with datum line 13 perfectly aligned with pointer 14 of the slide, is fitted between the projector and the reflecting disc on the vertical plane (Figs. 1 and 2) at right angles to the rotation axis of the subject to be examined.

The above described appliance is operated as follows:

In order to obtain the alignment of the focal spot with the rotation axis of the subject and of the film, it is sufficient to light the projector and to set it in such a way as to obtain the perfect superimposition of the recticle applied on the lenses on the recticle applied to the disc.

To do this it is evidently sufficient to set properly the projector by adjustment or by turning it slightly on its own axis and by focussing properly the projector reticle. In this way beside the alignment a light reflection will be obtained, derived from the mirror, which light reflection by falling on screen 15 will make it possible to control that the X-rays shall fall exactly on the film.

As complement, sleeve 11 fitted on stem 10 is then moved vertically so that, after the projector has been focused, datum line 13, marked on the transparent screen fitted to the slide, will coincide with the horizontal line of the cross reticle applied on the lenses of the projector and on the disc of the tube, so that, by means of the pointer of the slide, the exact section of the subject to be reproduced on the film, shall be fixed.

The above with reference to laminographic investigations by transverse axial projection (horizontal strata).

However the contrivance herein described can also be employed in ordinary frontal laminography, provided always that the film be placed vertically instead of horizontally, that the ray beam be horizontal, and lastly that the time of emission of the rays should last only for a fixed arc of rotation of the subject (instead of the time corresponding to a complete rotation as it is necessary for obtaining the transverse axial stratum with film placed horizontally and oblique ray-beam) in as much as the addition of prism 16 (Fig. 7) fixed at the exit of the light beam of the projector so as to be turnable and if necessary movable, permits the alignment of the three elements so that the X-ray beam will fall efficaciously on the subject and on the film.

As a matter of fact, in this case when the projector is placed vertically, it is possible to align on the same straight line a point of the film with a point of the subject and finally with the focal spot, by increasing or reducing the distance between the prism and the exit of the light beam, and by rotating the projector. In practice, the reticle marked on disc 7 will be enclosed between two rigourously parallel lines L and L' (Fig. 6) in order to give the operator an appreciable amount of ease in obtaining superimposition owing to the fact that the equal distance of the parallel lines from the central reticle grants better vision in spite of the different size of the projected image according to the distance.

Evidently the optical contrivance herein described can, if need be, be inverted in its components in such a way as to bring back the disc connected with the tube on the rotation axis of the film and the projector on to the tube or in any other intermediate position.

On the basis of what is shown in Figs. 8 and 9 and without prejudice to the cross reticle inserted in the light source as in Fig. 4, the components of the alignment are slide M (Fig. 9) on the outside of which datum line M is marked and a system of discs (Fig. 8) composed of an opaque disc O on which a cross reticle O' is marked, and over which, in the way of the lid of a box and at a short distance, a transparent disc T is placed bearing a cross reticle T' similar to the one just mentioned, so that by the superimposition of the cross reticle of the projector and of the two reticles superimposed to each other and marked on the disc connected with the tube, the purpose will be achieved of the alignment of the film-subject rotation axis with the focal spot of the tube, as well as the purpose of looking on the subject for the stratum to be reproduced. In this way we dispense with mirror 8 of the disc and with screens 12 and 15 respectively provided for on stem 10 and on projector 1.

In Fig. 8 the light source is placed so that adjustments can be made by means of handle R, and the unit can have the desired mobility.

On the basis of what is shown on Fig. 10 the components meant to determine the position of the stratum are a screen of special shape apt to allow the passage of a portion of light, and a disc V connected to the tube on which the light will be projected. This disc will be provided with a cross reticle so that it will be possible to regulate the incidence of the light, so that beside the alignment of the images of light with the lines marked on the disc, the section to be laminographed will be determined by the coincidence of projection $V^2$ of sliding pointer V'. However, the prism as per Fig. 7 can also be fitted in such a way as to permit an angulation within determined limits of the reflected light.

It is claimed:

1. In an X-ray machine including an adjustable X-ray tube means and rotatable film-holding means, in combination, a light beam emitting member secured to one of said means and having an axis parallel to and spaced from a plane defined by the axis of rotation of said film-holding means and the axis of the beam of rays emitted by said X-ray tube means; and a disc member fixedly secured to the other of said means and provided with an indicator mark spaced the same distance from said plane as said axis of said light beam emitting means so that a beam of light may be centered on said indicator mark.

2. In an X-ray machine including an adjustable X-ray tube means and rotatable film-holding means, in combination, a light beam emitting member secured to said film-holding means and having an axis parallel to and spaced from a plane defined by the axis of rotation of said film-holding means and the axis of the beam of rays emitted by said X-ray tube means; and a disc member fixedly secured to said X-ray tube means normal thereto and provided with an indicator mark spaced the same distance from said plane as said axis of said light beam emitting means so that a beam of light may be centered on said indicator mark.

3. In an X-ray machine including an adjustable X-ray tube means and rotatable film-holding means, in combination, a light beam emitting member including a lens provided with hair lines crossing at right angles, said light beam emitting means being secured to said film-holding means and having an axis parallel to and spaced from a plane defined by the axis of rotation of said film-holding means and the axis of the beam of rays emitted by said X-ray tube means; and a disc member fixedly secured to said X-ray tube means normal thereto and provided with hair lines crossing at right angles and forming an indicator mark spaced the same distance from said plane as said axis of said light beam emitting means so that a beam of light may be centered on said indicator mark.

4. In an X-ray machine including an adjustable X-ray tube means and rotatable film-holding means, in combination, a light beam emitting member including a lens provided with hair lines crossing at right angles, said light beam emitting means being secured to said film-holding means and having an axis parallel to and spaced from a plane defined by the axis of rotation of said film-holding means and the axis of the beam of rays emitted by said X-ray tube means; a mirror member fixedly secured to said X-ray tube means normal thereto and provided with hair lines crossing at right angles and forming an indicator mark spaced the same distance from said plane as said axis of said light beam emitting means so that a beam of light may be centered on said indicator mark; and an adjustable screen member provided with an indicating mark and located intermediate said light beam emitting member and said mirror and adapted to receive an image reflected by said mirror member.

5. An arrangement according to claim 4 in which said light beam emitting member includes graduated lenses permitting reading of the distance between said film-holding means and a focal spot produced by said X-ray tube means.

6. In an X-ray machine including an adjustable X-ray tube means and rotatable film-holding means, in combination, a light beam emitting member including a lens provided with hair lines crossing at right angles, said light beam emitting means being secured to said film-holding means turnably about a horizontal axis and having an axis parallel to and spaced from a plane defined by the axis of rotation of said film-holding means and the axis of the beam of rays emitted by said X-ray tube means; indicating means indicating the amount of turning of said light beam emitting member about said horizontal axis; a mirror member fixedly secured to said X-ray tube means normal thereto and provided with hair lines crossing at right angles and forming an indicator mark spaced the same distance from said plane as said axis of said light beam emitting means so that a beam of light may be centered on said indicator mark; and an adjustable screen member provided with an indicating mark and located intermediate said light beam emitting member and said mirror and adapted to receive an image reflected by said mirror member.

7. In an X-ray machine including an adjustable X-ray tube means and rotatable film-holding means, in combination, a light beam emitting member including a lens provided with hair lines crossing at right angles, said light beam emitting means being secured to said film-holding means and having an axis parallel to and spaced from a plane defined by the axis of rotation of said film-holding means and the axis of the beam of rays emitted by said X-ray tube means; adjustable prism means mounted on said light beam emitting member and adapted to deflect a beam of light; a mirror member fixedly secured to said X-ray tube means normal thereto and provided with hair lines crossing at right angles and forming an indicator mark spaced the same distance from said plane as said axis of said light beam emitting means so that a beam of light may be centered on said indicator mark; and an adjustable screen member provided with an indicating mark and located intermediate said light beam emitting member and said mirror and adapted to receive an image reflected by said mirror member.

8. In an X-ray machine including an adjustable X-ray tube means and rotatable film-holding means, in combination, a light beam emitting member including a lens provided with hair lines crossing at right angles, said light beam emitting means being secured to said film-holding means and having an axis parallel to and spaced from a plane defined by the axis of rotation of said film-holding means and the axis of the beam of rays emitted by said X-ray tube means; an opaque disc member fixedly secured to said X-ray tube means normal thereto and provided with hair lines crossing at right angles and forming an indicator mark spaced the same distance from said plane as said axis of said light beam emitting means so that a beam of light may be centered on said indicator mark; and a transparent disc located intermediate said light beam emitting member and said opaque disc member and marked with hair lines crossing at right angles.

9. In an X-ray machine including an adjustable X-ray tube means and rotatable film-holding means in combination, a light beam emitting member secured to said film-holding means and having an axis parallel to and spaced from a plane defined by the axis of rotation of said film-holding means and the axis of the beam of rays emitted by said X-ray tube means; a disc member fixedly secured to said X-ray tube means normal thereto and provided with indicating lines having a center spaced the same distance from said plane as said axis of said light beam emitting means; and an opaque screen located intermediate said light beam emitting member and said disc member and provided with cut-outs corresponding to said indicating lines of said disc so that a beam of light shaped by said cut-outs may be centered within said indicating lines.

GINO ZURLI.
ALDO DE REGIBUS.

REFERENCES CITED

The following references are of record in the file of this patent:

| Number | Name | Date |
|---|---|---|
| 1,608,269 | Freund | Nov. 23, 1926 |
| 1,832,865 | Israel | Nov. 24, 1931 |
| 2,455,928 | Hawks | Dec. 14, 1948 |